(12) United States Patent
Riggins

(10) Patent No.: US 7,287,271 B1
(45) Date of Patent: *Oct. 23, 2007

(54) SYSTEM AND METHOD FOR ENABLING SECURE ACCESS TO SERVICES IN A COMPUTER NETWORK

(75) Inventor: Mark D. Riggins, San Jose, CA (US)

(73) Assignee: Visto Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/841,950

(22) Filed: Apr. 8, 1997

(51) Int. Cl.
*H04L 9/00* (2006.01)

(52) U.S. Cl. .......................... 726/3; 705/64; 713/168; 15/749

(58) Field of Classification Search ............ 380/23–25, 380/49, 255; 713/200, 201, 202, 161, 166; 709/203, 229, 201, 223, 225; 726/3–4, 11; 705/50, 64, 67, 78

See application file for complete search history.

(56) References Cited

U.S. PATENT DOCUMENTS

| | | | |
|---|---|---|---|
| 4,652,698 A | 3/1987 | Hale et al. ..................... 380/24 |
| 4,714,995 A | 12/1987 | Materna et al. | |
| 4,817,050 A * | 3/1989 | Komatsu et al. ............... 707/10 |
| 4,831,582 A | 5/1989 | Miller et al. ................. 364/900 |
| 4,882,752 A | 11/1989 | Lindman et al. | |
| 4,897,781 A | 1/1990 | Chang ........................ 364/200 |
| 4,916,738 A | 4/1990 | Chandra et al. | |
| 5,048,085 A | 9/1991 | Abraham et al. ............. 380/23 |
| 5,150,407 A | 9/1992 | Chan | |
| 5,220,603 A * | 6/1993 | Parker .......................... 380/21 |
| 5,263,157 A | 11/1993 | Janis .......................... 395/600 |
| 5,265,159 A | 11/1993 | Kung | |
| 5,333,266 A | 7/1994 | Boaz et al. | |
| 5,388,255 A | 2/1995 | Pytlik et al. | |
| 5,392,390 A | 2/1995 | Crozier | |
| 5,420,927 A | 5/1995 | Micali ......................... 380/23 |
| 5,425,102 A | 6/1995 | Moy | |

(Continued)

FOREIGN PATENT DOCUMENTS

CA     2191505     6/1997

(Continued)

OTHER PUBLICATIONS

Article by Bellovin et al., entitled: "Network Firewalls" Published by IEEE Communications Magazine Sep. 1994, pp. 50-57.

(Continued)

*Primary Examiner*—T. B. Truong
(74) *Attorney, Agent, or Firm*—Manatt, Phelps & Phillips

(57) ABSTRACT

A global server includes a communications engine for establishing a communications link with a client; security means coupled to the communications engine for determining client privileges; a servlet host engine coupled to the security means for providing to the client, based on the client privileges, an applet which enables I/O with a secured service; and a keysafe for storing a key which enables access to the secured service. The global server may be coupled to multiple sites, wherein each site provides multiple services. Each site may be protected by a firewall. Accordingly, the global server stores the keys for enabling communication via the firewalls with the services.

25 Claims, 8 Drawing Sheets

U.S. PATENT DOCUMENTS

| | | | |
|---|---|---|---|
| 5,434,918 A | 7/1995 | Kung et al. .................... 380/25 |
| 5,483,596 A * | 1/1996 | Rosenow et al. ............. 380/25 |
| 5,491,752 A | 2/1996 | Kaufman et al. ............. 380/30 |
| 5,495,533 A | 2/1996 | Linehan ........................ 380/21 |
| 5,510,777 A * | 4/1996 | Pilc et al. .............. 340/825.31 |
| 5,544,320 A | 8/1996 | Konrad |
| 5,544,322 A | 8/1996 | Cheng et al. .......... 395/200.12 |
| 5,572,643 A | 11/1996 | Judson ........................ 395/793 |
| 5,581,749 A | 12/1996 | Hossain et al. ............. 395/600 |
| 5,588,132 A | 12/1996 | Cardoza |
| 5,604,788 A | 2/1997 | Tett |
| 5,613,012 A | 3/1997 | Hoffman et al. ............ 382/115 |
| 5,623,601 A | 4/1997 | Vu ........................ 395/187.01 |
| 5,627,658 A | 5/1997 | Connors et al. ............ 358/407 |
| 5,627,997 A | 5/1997 | Pearson et al. |
| 5,632,011 A | 5/1997 | Landfield et al. |
| 5,634,053 A | 5/1997 | Noble et al. |
| 5,644,354 A | 7/1997 | Thompson et al. ........... 348/13 |
| 5,647,002 A | 7/1997 | Brunson ........................ 380/49 |
| 5,652,884 A | 7/1997 | Palevich |
| 5,657,390 A * | 8/1997 | Elgamal et al. ............... 380/49 |
| 5,664,207 A | 9/1997 | Crumpler et al. |
| 5,666,530 A | 9/1997 | Clark et al. ................. 395/617 |
| 5,666,553 A | 9/1997 | Crozier ....................... 395/803 |
| 5,675,782 A * | 10/1997 | Montague et al. .......... 395/609 |
| 5,678,039 A | 10/1997 | Hinks et al. |
| 5,680,542 A | 10/1997 | Mulchandani |
| 5,682,478 A * | 10/1997 | Watson et al. .......... 713/201 X |
| 5,682,524 A | 10/1997 | Freund et al. .............. 395/605 |
| 5,684,951 A | 11/1997 | Goldman et al. |
| 5,684,984 A | 11/1997 | Jones et al. |
| 5,684,990 A | 11/1997 | Boothby ..................... 707/203 |
| 5,687,322 A | 11/1997 | Deaton et al. |
| 5,701,400 A | 12/1997 | Amado |
| 5,701,423 A | 12/1997 | Crozier ....................... 395/335 |
| 5,706,427 A | 1/1998 | Tabuki ................... 395/187.01 |
| 5,706,502 A | 1/1998 | Foley et al. ................. 395/610 |
| 5,710,922 A | 1/1998 | Alley et al. |
| 5,713,019 A | 1/1998 | Keaten |
| 5,715,403 A | 2/1998 | Stefik .......................... 395/244 |
| 5,717,925 A | 2/1998 | Harper et al. |
| 5,721,779 A | 2/1998 | Funk ........................... 380/23 |
| 5,727,202 A | 3/1998 | Kucala |
| 5,729,735 A | 3/1998 | Meyering |
| 5,742,668 A | 4/1998 | Pepe et al. |
| 5,752,059 A | 5/1998 | Holleran et al. |
| 5,752,246 A | 5/1998 | Rogers et al. |
| 5,754,830 A | 5/1998 | Butts et al. ................. 395/500 |
| 5,757,916 A | 5/1998 | MacDoran et al. ........... 380/25 |
| 5,758,150 A | 5/1998 | Bell et al. |
| 5,758,354 A | 5/1998 | Huang et al. |
| 5,758,355 A | 5/1998 | Buchanan |
| 5,764,902 A | 6/1998 | Rothrock |
| 5,765,171 A | 6/1998 | Gehani et al. |
| 5,768,510 A | 6/1998 | Gish ..................... 395/200.33 |
| 5,778,346 A | 7/1998 | Frid-Nielsen et al. ....... 395/208 |
| 5,784,463 A * | 7/1998 | Chen et al. ................... 380/21 |
| 5,784,464 A * | 7/1998 | Akiyama et al. ............. 380/25 |
| 5,787,172 A | 7/1998 | Arnold ........................ 380/21 |
| 5,787,441 A | 7/1998 | Beckhardt et al. |
| 5,790,974 A | 8/1998 | Tognazzini |
| 5,794,252 A | 8/1998 | Bailey et al. |
| 5,799,086 A | 8/1998 | Sudia .......................... 380/23 |
| 5,802,530 A | 9/1998 | Van Hoff ................... 707/513 |
| 5,812,398 A | 9/1998 | Nielsen |
| 5,812,668 A | 9/1998 | Weber ........................ 380/24 |
| 5,812,773 A | 9/1998 | Norin |
| 5,815,683 A | 9/1998 | Vogler ........................ 395/500 |
| 5,818,935 A * | 10/1998 | Maa ........................... 380/200 |
| 5,828,840 A * | 10/1998 | Cowan et al. ............. 709/203 |
| 5,832,483 A | 11/1998 | Barker |
| 5,835,087 A | 11/1998 | Herz et al. |
| 5,835,601 A | 11/1998 | Shimbo et al. |
| 5,845,282 A | 12/1998 | Alley et al. |
| 5,857,201 A | 1/1999 | Wright, Jr. et al. |
| 5,862,325 A | 1/1999 | Reed et al. |
| 5,862,346 A | 1/1999 | Kley et al. |
| 5,870,544 A | 2/1999 | Curtis .................... 395/187.01 |
| 5,870,759 A | 2/1999 | Bauer et al. |
| 5,870,765 A | 2/1999 | Bauer et al. |
| 5,872,847 A * | 2/1999 | Boyle et al. ................. 713/151 |
| 5,878,230 A | 3/1999 | Weber et al. |
| 5,909,689 A | 6/1999 | Van Ryzin |
| 5,924,103 A | 7/1999 | Ahmed et al. |
| 5,928,329 A | 7/1999 | Clark et al. |
| 5,943,676 A | 8/1999 | Boothby |
| 5,951,652 A | 9/1999 | Ingrassia et al. ............. 709/248 |
| 5,961,590 A | 10/1999 | Mendez et al. |
| 5,966,714 A | 10/1999 | Huang et al. |
| 5,968,131 A | 10/1999 | Mendez et al. |
| 5,974,238 A | 10/1999 | Chase, Jr. |
| 5,982,898 A | 11/1999 | Hsu ........................... 380/23 |
| 5,987,609 A | 11/1999 | Hasebe |
| 5,999,932 A | 12/1999 | Paul |
| 5,999,947 A | 12/1999 | Zollinger et al. ........... 707/203 |
| 6,006,017 A | 12/1999 | Joshi et al. |
| 6,020,885 A | 2/2000 | Honda |
| 6,021,427 A | 2/2000 | Spagna et al. |
| 6,023,700 A | 2/2000 | Owens et al. |
| 6,023,708 A | 2/2000 | Mendez et al. |
| 6,034,621 A | 3/2000 | Kaufman |
| 6,052,735 A | 4/2000 | Ulrich et al. |
| 6,073,165 A | 6/2000 | Narasimhan et al. |
| 6,088,451 A * | 7/2000 | He et al. ........................ 726/8 |
| 6,094,477 A | 7/2000 | Nada et al. |
| 6,108,691 A | 8/2000 | Lee et al. |
| 6,108,709 A | 8/2000 | Shinomura et al. |
| 6,118,856 A | 9/2000 | Paarsmarkt et al. |
| 6,125,281 A | 9/2000 | Wells et al. |
| 6,131,096 A | 10/2000 | Ng et al. |
| 6,131,116 A | 10/2000 | Riggins et al. |
| 6,138,146 A | 10/2000 | Moon et al. |
| 6,151,606 A | 11/2000 | Mendez |
| 6,154,844 A | 11/2000 | Touboul et al. |
| 6,169,986 B1 | 1/2001 | Bowman et al. |
| 6,182,118 B1 | 1/2001 | Finney et al. |
| 6,212,529 B1 | 4/2001 | Boothby et al. |
| 6,249,805 B1 | 6/2001 | Fleming |
| 6,295,541 B1 | 9/2001 | Bodnar et al. |
| 6,304,881 B1 | 10/2001 | Halim et al. |
| 6,311,186 B1 | 10/2001 | MeLampy et al. |
| 6,324,542 B1 | 11/2001 | Wright, Jr. et al. |
| 6,334,140 B1 | 12/2001 | Kawamata |
| 6,343,313 B1 | 1/2002 | Salesky et al. |
| 6,389,455 B1 | 5/2002 | Fuisz |
| 6,438,583 B1 | 8/2002 | McDowell et al. |
| 6,446,090 B1 | 9/2002 | Hart |
| 6,477,545 B1 | 11/2002 | LaRue |
| 6,510,455 B1 | 1/2003 | Chen et al. |
| 6,564,218 B1 | 5/2003 | Roth |
| 6,631,416 B2 | 10/2003 | Bendinelli et al. |
| 6,697,942 B1 | 2/2004 | L'Heureux et al. |

FOREIGN PATENT DOCUMENTS

| | | |
|---|---|---|
| CA | 2210763 | 1/1999 |
| EP | 0684558 | 11/1995 |
| EP | 0801478 | 10/1997 |
| EP | 0820028 | 1/1998 |
| JP | 02000003314 | 1/2000 |
| WO | WO 96/17306 | 6/1996 |
| WO | WO 97/04389 | 2/1997 |
| WO | WO 97/24678 | 7/1997 |
| WO | WO 97/35265 | 9/1997 |

| | | |
|---|---|---|
| WO | WO 99/05620 | 2/1999 |
| WO | 99/45451 | 9/1999 |
| WO | WO 00/22543 | 4/2000 |
| WO | 2002/0138599 | 9/2002 |
| WO | 2002/0174372 | 11/2002 |

OTHER PUBLICATIONS

Article by Steffen Stempel, entitled: "IPAccess-An Internet Service Access System for Firewall Installations" Published by IEEE Communications Magazine Feb. 16, 1995, pp. 31-41.
Article by Braun et al., entitled: "Web Traffic Characterization: an assessment of the impact of caching documents from NCSA's web server" Published by Elsevier Science B.V. 1995 pp. 37-51.
Article by Nelson et al., entitled: "Security for Infinite Networks" Published by IEEE Communications Magazine on Aug. 22, 1995, pp. 11-19.
Article by Greenwald et al., entitled: "Designing an Academic Firewall: Policy, Practice, and Experience with SURF" Published by IEEE Communications Magazine on Feb. 22, 1996, pp. 79-92.
Article by Kiuchi et al., entitled: "C-HTTP—The Development of a Secure, Closed HTTP-based Network on the Internet" Published by IEEE Proceedings of SNDSS on Feb. 22, 1996, pp. 64-75.
Article by S. Cobb, entitled: "Establishing Firewall Policy" Published by National Computer Security Assn. on Jun. 25-27, 1996, pp. 198-205.
Article by Mark Brown, entitled: "Using NetScape 2" Published by Que Corporation 1995, pp. 885-907.
Article by Douglas Kramer, entitled: "The Java Platform" Published by JavaSoft, Inc. May 1996, pp. 1-25.
Package java.applet http://www-nrg.eelbl.gov/jef/apibook/javam. htm, published by Sun Microsystems, Inc. Apr. 1996.
Package java.net http://www-nrg.eelbl.gov/jef/apibook/javaf.htm, published by Sun Microsystems, Inc. Apr. 1996.
Servlet Tutorial http://mech.postech.ac.kr/Java/java.sun.com/products/jeeves/CurrentRelease/doc/servlet_tutorial/servlet_tutorial. html Aug. 20, 1996.
Java Servlet Application Programming Interface White Paper, Document Version 0.45, URL: http://mech.postech.ac.kr/Java/java. sun.com/products/jeeves/CurrentRelease/doc/api.html, Dated: Aug. 2, 1996, Page(s): 1-6.
Tanenbaum, Andrew S., "Computer Network", Third Edition, Prentice-Hall 1996, ISBN 0-13-349945-6, Chapter 7, Sections 7.1.4 to 7.1.6, pp. 597-618.
Knudsen, Jonathan, "Java Cryptography", First Edition, O'Reilly & Assoc. 1998, ISBN 1-56592-402-9, pp. 79-91.
Web page: www.verisign.com/press/product/isv.html, Verisign Press Release, "Verisign Enhances Digital IDS to Enable Universal Website Login and One-Step Registration", Nov. 3, 1998, 3 pages.
Kohl, John T., et al.; "The Evolution of the *Kerberos* Authentication Service"; 1991; pp. 1-15; This paper is a revision of a paper presented at the Spring 1991 EurOpen Conference in Tromso, Norway.
Adams, Charlotte; "Multilevel Secure Networking Charges Ahead"; Federal Computer Week; Apr. 12, 1993; 5 pages.
Jaeger, Trent and Atul Prakash; "Implementation of a Discretionary Access Control Model for Script-based Systems"; IEEEE Jun. 1995; 15 pages.
Radosevich, Linda, "Users want unified mail directories," Computerworld, Aug. 30, 1993, p. 12.
Bruno, Charles, "Firm pushes E-mail limits beyond rivals'," Network World, Aug. 12, 1991, pp. 33, 53.
Sliwa, Carol and Cole, Barb, "MESA declares a groupware detente," Network World, Aug. 5, 1996, p. 29.
Grosse, Eric, "Repository Mirroring," ACM Transactions on Mathematical Software, vol. 21, No. 1, Mar., 1995, pp. 89-97.
Schilit, Bill N. and Theimer, Marvin M., "Disseminating Active Map Information to Mobile Hosts," IEEE Network, Sep./Oct. 1994, pp. 22-32.
Levy, Eliezer and Silberschatz, Abraham, "Distributed File Systems: Concepts and Examples," ACM Computing Surveys, vol. 22, No. 4, Dec. 1990, pp. 321-74.

Rymer, John R., "The Muddle in the Middle," Byte, Apr. 1996, pp. 67-70.
Baum, David, "Intranet Politics and Technologies," Byte, May 1997, pp. 88A-88H.
Udell, Jon, "Push Me, Pull You," Byte, Sep. 1996, pp. 117-120.
Kador, John, "The Ultimate Middleware," Byte, Apr. 1996, pp. 79-83.
Brown, Mark, "Using Netscape 2," Que Corporation, 1995, pp. 885-907.
Kramer, Douglass, "The Java Platform," Javasoft, May 1996, pp. 1-25.
Package java.applet; java.net, http://www-nrg.ee.lbl.gov/j4/apibook/javaf.htm, javam.htm, Apr. 22, 1996.
Servlet Tutorial, http://mecch.postech.ac.kr/Java/java.sun.com/products/jeeves/current release/doc/servlet_tutorial/servlet_tutorial.html.
Freier et al., entitled "The SSL Protocol, Version 3.0," Netscape Communications, dated Nov. 18, 1996, pp. 1-59, Downloaded from URL=http://www.home.netscape.com/eng/ss13/draft302.txt.
Java Servlet Application Programming Interface White Paper, http://mech.postech.ac.kr/Java.sun.com/products/jeeves/CurrentRelease/doc/api.html, Aug. 1996, pp. 1-6.
Singhai, M., "Update transport: A new technique for update synchronization in replicated database systems," IEEE Transactions on Software Engineering, vol. 16, No. 12, dec. 1990, pp. 1325-1336.
Rao, H. & Skarra, A., "A transparent service for synchronized replication across loosely-connected file systems," IEEE Transactions on Software engineering, Apr. 1995, pp. 110-117.
Crispen, M., "Internet Message Access Protocol - RFC 1730 Version 4," Dec. 1994, pp. 1 -52, http://www.faqs.org/rfcs/rfc1730. html.
Rao, Venkat & Aline, Mary, "Burrowing through firewalls," Dec. 1996, pp. 1-5, http://java.sun.com/developer/technicalArticles/Innerworkings/Burrowing/.
Brown, Margaret J., "The Visto Briefcase Pro Puts Your PIM On the Internet," Ayg. 13, 1998, 1 page, URL:http://www.zdnet.com/zdnn/stories/zdnn_display/0,3440,341892,00.html.
Tanenbaum, Andrew, "Computer Networks," Third Edition, Prentice-Hall, 1996, see entire document.
Knudsen, Jonathan, "Java Cryptography," O'Reilly, 1998, p. 112, 160.
Verisign Press Release, "Virisign Enhances Digital IDS to Enable Universal Website Login and One-step Registration," <www.verisign.com/press/prodcutive/isv.html>, especially 2nd paragraph.
Crispin, M., "IMAP4 Compatibility with IMAP2BIS", Network Working Group RFC 2061, Dec. 1996, XP002154026, <URL:http://www.imc.org/rfc2061>, retrieved Nov. 28, 2000, p. 1, last paragraph.
"Configuration of a wireless-connected mobile computer," IBM Technical Disclosure Bulletin, US, IBM Corp., New York, vol. 38, No. 4, Apr. 1, 1995, pp. 15-17, XP000516057, ISSN: 0018-8689, the whole document.
Mason, Justin, "Tunneling over HTTP," Dec. 11, 1996, pp. 1-2 http://www.netsys.com/firewalls/firewalls-9612/0488.html.
Elgamal, Taher, "The Secure Sockets Layer Protocol (SSL)," agenda for the Danvers IETF meeting, Apr. 1995, pp. 1-5 - http://www.ietf.cnri.reston.va.us/proceeedings/95apr/sec/cat.elgamal. slides.html.
Research Disclosure: "Provide Auto-Forwarding Based On Criteria Selected by the User"; Oct. 1, 1989; 1 page; No. 306; Kenneth Mason Publications; XP000085405; ISSN 0374-4353.
Chan, M.C. et al., "Appliaction of Compaction Technique to Optimizi ng Wireless Email Transfer," IEEE Wireless Communications and Networking Conference 1999, 1535 Section A.
Crispin, M., "Internet Message Access Protocol Version 4revl," 1996 Section 2.3.1.1.
Jaeger and Prakash, "Implementation of a Discretionary Access Control Model for Script-based Systems," IEEE Jun. 1995.
Adams, Charlotte, "Multilevel Secure Networking Charges Ahead," Federal Computer Week, Apr. 12, 1993.
Kohl, John, "The Evolution of the Kerberos Authentication Service," 1991.

Young et al., "Deniable Password Snatching: On the Possibility of Evasive Electronic Espionage," 1997, IEEE, pp. 224-35.
Abel, Amee, "E-mail anywhere," May 1998, Time, pp. 1-4.
Satyanarayanan, M., "Integrating Security in a Large Distributed System," ACM Transactions on Computer Systems, vol. 7, No. 3, Aug. 1989, pp. 247-80.
Kistler, James J. and Satyanarayanan, M., "Disconnected Operation in the Coda File System," ACM Transactions on Computer Systems, vol. 10, No. 1, Feb. 1992, pp. 3-25.
Hills, Alex and Johnson, David B., "Wireless Data Network Infrastructure at Carnegie Mellon University," IEEE Personal Communications, 3(1), Feb. 1996.
Satyanarayanan, Mahadev, "Mobile Information Access," IEEE Personal Communications, Feb. 1996, pp. 26-33.
Satyanarayanan, Mahadev et al., "Coda: A Highly Available File System for a Distributed Workstation Enviroment," IEEE Transactions on Computers, vol. 39, No. 4, Apr. 1990, pp. 447-59.
Satyanarayanan, Mahadev, "Scalable, Secure, and Highly Available Distributed File Access," Computer, May 1990, pp. 9-21.
Mummert, Lily B. et al., "Exploiting Weak Connectivity for Mobile File Access," SIGOPS '95, Dec. 1995, pp. 143-55.
Terry, Douglas B. et al., "Managing Update Conflicts in Bayou, a Weakly Connected Replicated Storage System," SIGOPS '95, Dec. 1995, pp. 172-183.
Demers, Alan et al., "The Bayou Architecture: Support for Data Sharing among Mobile Users," Proceeding of the Workshop on Mobile Computing Systems and Applications, Santa Cruz, California, Dec. 1994, pp. 2-7.
Peterson, Karin et al., "Bayou: Replicated Database Services for World-wide Applications," Proceedings Seventh ACM SIGOPS European Workshop (EuroSIGOPS '96), Connemara, Ireland, Sep. 1996, pp. 275-280.
Crocker, David H., "RFC822: Standard for ARPA Internet Texi Messages," http://www.w3.org/Protocols/rfc822/.
Theisen, Tim, "AFS distributed filesystem FAQ (1/2)," posted to uwisc.general newsgroup, Jul. 25, 1994.
Theisen, Tim, "AFS distributed filesystem FAQ (2/2)," posted to uwisc.general newsgroup, Jul. 25, 1994.
Schubert, Eric, "re: telnet/internet and . . . ," posted to comp.sys.hp.mpe newsgroup, Jun. 30, 1995.
Glazman, Daniel, "SOFTWARE: HHTPtool [sic] 1.l, a file transfer utility over HTTP using PUT and GET," posted to comp.infosystems.www.announce newsgroup, May 17, 1995.
Glazman, Daniel, "SOFTWARE: HTTPtool v1.0 for Windows3.x, file transfer utility over HTTP," posted to comp,infosystems.www.announce newsgroup, Mar. 21, 1996.
Angus, Jeffrey G., "Sales force automation has a GoldMine," Computerworld, Oct. 7, 1996, p. 59.
Salamone, Salvatore, "Middle(ware) Management," Byte, Apr. 1996, pp. 71-76.
Nance, Barry, "Balance the Load with Transaction Server," Byte, Jun. 1997, pp. 81-84.
Francett, Barbara, "Replication on the Run," Software Magazine, Aug. 1996, pp. 63-66.
Darling, Charles B., EDA/SQL Loses a Little and Gaines a Lot, Datamation, May 1, 1996, p. 12.
Varney, Sarah E., "Arm your salesforce with the Web," Datamation, Oct. 1996, pp. 72-74.
Fulcher, Jim, "Is it or isn't?," Manufacturing Systems, Oct. 1996, pp. 56-61.
Lamb, John and Cusato, Tony, "LAN-Based Office for Enterprise, A Case Study," Proceedings, 19th Conference on Local Computer Networks, Minneapolis, Minnesota, Oct. 2-5, 1194, pp. 440-447.
Kawell Jr., Leonard et al., "Replicated Document Management In A Group Communication Systems," presented at the Second Conference on Computer-Supported Cooperative Work, Portland, Oregon, Sep. 26-28, 1988, as printed in Groupware: Software for Computer-Supported Cooperative Work, IEEE Computer Society Press, pp. 226-235.
Hong, Jack et al., "Personal Electronic Notebook with Sharing,"Proceedings of the Fourth Workshop on Enabling Technologies: Infrastructure for Collaborative Enterprises, Berkeley Springs, West Virginia, Apr. 20-22, 1995, pp. 88-94.

Mace, Scott, "DataSync 2.0 enhances synchronization of data," InfoWorld, Jun. 6, 1994, p. 28.
Mace, Scott, "Database replication products debut." InfoWorld, Nov. 15, 1993, p. 19.
Gryphon, Robert, "DataSync line matches up," InfoWorld, May 23, 1994, p. 161.
Patterson, John F. et al., "Notification Servers for Synchronous Groupware," Proceedings, ACM 1996 Conference on Computer Supported Cooperative Work, Boston, Massachusetts, Nov. 16-20, 1996, pp. 122-129.
Zhao, Jian and Hoppe, H. Ulrich, "Supporting Flexible Communication in Heterogeneous Multi-User Environments," 1994 IEEE, pp. 442-449.
Gong, Li, "Enclaves: Enabling Secure Collaboration Over the Internet," IEEE Journal on Selected Areas in Communications, vol. 15, No. 3, Apr. 1997, pp. 567-575.
Bruno, Lee, "Directory Services Tie It All Together," Data Communications, Mar. 1997, pp. 75-83.
Guy, Richard G. et al., "Implementation of the Ficus Replicated File System," Proceedings of the Summer 1990 USENIX Conference, Anaheim, California, Jun. 11-15, 1990, pp. 63-70.
Page, Thomas W. Jr. et al., "Management of Replicated Volume Location Data in the Ficus Replicated Data System," Conference Proceedings, USENIX Summer 1991 Technical Conference, Nashville, Tennessee, Jun. 10-14, 1991, pp. 17-29.
Reiher, Peter et al., "Resolving File Conflicts in the Ficus File System," Conference Proceedings, USENIX Summer 1994 Technical Conference, Boston, Massachusetts, Jun. 6-10, 1994, pp. 183-195.
Walker, Bruce et al., "The LOCUS Distributed Operating System," Proceedings of the Ninth ACM Symposium on Operating Systems Principles, Bretton Woods, New Hampshire, Oct. 10-13, 1983, pp. 49-70.
Parker, D. Stott Jr. et al., "Detection of Mutual Inconsistency in Distributed Systems," IEEE Transactions on Software Engineering, vol. SE-9, No. 3, May 1983, pp. 240-256.
Ceri, Stefano et al., "The Case for Independent Updates", Second Workshop on the Management of Replicated Data, Monterey, California, Nov. 12-13, 1992, pp. 17-19.
Dowing, Alan R. et al., "OSCAR: A System for Weak-Consistency Replication", Proceedings, Workshop on the Mangement of Replicated Data, Houston, Texas, Nov. 8-9, 1990, pp. 26-30.
Siegel, Alex et al., "Deceit: A Flexible Distributed File System", Proceedings of the Summer 1990 USENIX Conference, Anaheim, California, Jun. 11-15, 1990, pp. 51-61.
Chutani, Sailesh, "The Episode File System", Conference Proceedings, USENIX Winter 1992 Technical Conference, San Francisco, California, Jan. 20-24, 1992, pp. 43-59.
Seltzer, Margo, "An Implementation of a Log-Structured File System for UNIX", Conference Proceedings, USENIX Winter 1993 Technical Conference, San Diego, California, Jan. 25-29, 1993, pp. 307-326.
Vahalia, Uresh, "Metadata Logging in an NFS Server", Conference Proceedings, USENIX 1995 Technical Conference on UNIX and Advanced Computing Systems, New Orleans, Louisiana, Jan. 16-20, 1995, pp. 265-276.
Lotus Development Corporation, InterNotes Web Publishers Release 4, "InterNotes Web Publisher Guide", 1996, Cambridge, MA.
Lotus Development Corporation, Lotus Notes Release 4, "Database Manager's Guide", 1995, Cambridge, MA.
Lotus Development Corporation, Lotus Notes Release 4, "Administrator's Guide", 1995, Cambridge, MA.
IBM Lotus Technical Library, Lotus Notes Documentation, "Lotus Notes Internet Cookbook for Notes Release 3", Jan. 16, 1996, pp. 1-26 http://www-12/lotus.com/ldd/doc/domino_notes/cookbook/cbookv4.nsf/el250032896bf7b3a385256.
John Wiley & Sons, Inc. - Wiley Computer Publishing, Falkner, Mike, "How to Plan, Develop, and Implement Lotus Notes in Your Organization", 1996, USA4.
Lotus Development Corporation, Lotus Notes Release 4, "Deployment Guide", 1995, Cambridge, MA.

McGraw-Hill, Lamb, John P. and Lew, Peter W., "Lotus Notes Networks Design for Notes Release 3 and 4", 1996, Quebecor-Fairfield, PA.

Lotus Notes, "Overview - What is Lotus NotesPump?", including "notes Pump 1.0 Release Notes".

Lotus Development Corporation, Lotus Notes Release 3.1, The groupware standard, "Site and System Planning Guide", 1994, Cambridge, MA.

Lotus Development Corporation, Lotus Notes Release 3.1. The groupwarestandard, "Administrator's Guide Server for NetWare, OS/2, and UNIX", 1994, Cambridge, MA.

IBM Lotus Technical Library, Lotus Documentation, "Lotus Notes Internet Cookbook for Notes Release 4", Fe. 14, 1996, pp. 1-30 http://www-12.lotus.com.ldd.doc.domino_notes/cookbook/cbookv4,nsf/el25003288bf7b3a385256.

IntelliLink Corporation, IntelliLink for Windows Release 3.0, "User'sGuide", 1994, Nashua, NH.

Lotus Development Corporation, Lotus Notes Release 4, "Application Developer's Guide", 1995, Cambridge, MA.

Lotus Development Corporation, Lotus Notes Release 3.3 North American Server Edition, "Lotus Notes, The Groupware Standard", 1994, Cambridge, MA.

Sams Publishing, Dahl, Andrew, "Lotus Notes 4 Administrator's Survival Guide", 1996, Indianapolis, IN.

Sams Publishing, Tmaura, et al., "Lotus Notes 4 Unleashed", 1996, Indianapolis, IN.

Advisor Publications - Lotus Notes Advisor, Pyle, Hugh, "The Notes Architecture", 1995.

Advisor Pblications - Lotus Notes Advisor, Augun, Adury, "Intergrating Lotus Notes with Enetrprise Data", 1996.

Advisor Publications - Lotus Notes Advisor, Opyt, Barber and Dale, Robert, "Use the Internet as Your Lotus Notes WAN", 1996.

Lotus Development Corporation, Lotus Notes Knowledge Base, "What is The Notes Replicator?", 1995, Cambridge, MA.

Lotus Development Corporation, Lotus Notes Knowledge Base, "Firewall Security Overview and how Firewalls Relate to Lotus Notes", 1996, Cambridge, MA.

Networking Computing, Frenkel, Garry, "Pumping for Info: Notes and Database Integration", 1996.

IBM Corporation, Hawker, et al., "Secrets to Running Lotus Notes: The Decisions No One Tells You How To Make", 1996, Research Triangle Park, NC.

Lotus Notes Release 4, "Administrator's Guide," 1995 Lotus Development Corporation, Cambridge, MA.

Dahl, Andrew, "Lotus Notes 4 Administrator's Survival Guide," 1996 *Sams Publishing*, Indianapolis, IN.

P. Grous, "Creating and Managing a Web Site with Lotus' InterNotes WebNotes Web Publisher," *The View*, vol. 1, Issue 4, pp. 3-18 (Oct./Oct. 1995).

Lambert, M. "PCMAIL: A Distributed Mail System for Personal Computers," *Network Working Group*, Jun. 1998.

Kumar, Puneet, "Mitigating the Effects of Optimistic Replication in a Distributed File System", Ph.D, Thesis, School of Comp. Sci., Carnegie Mellon Univ., Dec. 1994.

Bruegge, Bernd and Bennington, Ben, "Applications of Mobile Computing and Communications," IEEE Personal Communications, Feb. 1996.

Husted, Bill "Calling up the Future FCC ruling will change the way we use Phones", *The Atlanta Journal and Constitution*, Jul. 16, 1992.

Lotus Notes Internet Cookbook for Notes Release 3 (Jan 1996).

L.Pyle, "A Jump start to the Top Ten R3-to-R4 Migration Considerations," *The View*, vol. 1., Issue 5 pp. 3-20 (Nov./Dec. 1995).

H. Wong, "Cashahi's Replic-Action: Delivering True Notes/DBMS Integration", *The View*, vol. 2, Issue 1, pp. 33-50 (Jan./feb. 1996).

IntelliLink Corporation, IntelliLink for Windows Release 3.0, "User's Guide" 1994, Nashra, NH.

K, Brown, et al., Mastering Lotus Notes published by *Sybex Inc.*, (1995).

Lotus Development Corporation, Lotus Notes Released 4, "Application Developer's Guide", 1995, Cambridge, MA.

Lotus Develoment Corporation, Lotus Notes Released 3.3 North American Server Edition, "Lotus Notes, the Groupware Standard", 1994 Cambridge, MA.

Sams Publishing, Tamura, et al., "Lotus Notes 4 Unleashed", 1996, Indianapolis, IN.

Advisor Publications - Lotus Notes Advisor, Pyle, Hugh, "the Notes Architecture", 1995.

Advisor Publications - Lotus Notes Advisor, Augun, Audry, "Integrating Lotus with Enterprise Data", 1996.

Advisor Publications - Lotus Notes Advisor, Opyt, Barbara and Dale, Robert, "Use the Internet as Your Lotus Notes WAN", 1996.

Lotus Development Corporation, Lotus Notes Knowledge Base, "What is the Notes Replicator?" 1995, Cambridge, MA.

Lotus Development Corporation, Lotus Notes Knowledge Base, "Firewall Security Overview and How Firewalls relate to Lotus Notes" 1996, Cambridge, MA.

Network Computing, Frenkel, Garry, "Pumping for Infor: Notes and Database Integration", 1996.

IBM Corporation, Hawker, et al., "Secrets to Running Lotus Notes: The Decisions No One Tells You How to Make", 1996, Research Triangle Park, NC.

IBM Lotus Technical Library, "Lotus Notes Internet Cookbook for Notes Release 4", http://www-12.lotus.com/ldd/doc/domino_notes/cookbook/cbookv4.nsf;e12503289bf7b3a3852562b3006b8fc5/9e9126d61cd7b8b9852562d00070f9b2?OpenDocument.

HTTP://222-128.ibm.com/deloperworks/lotus/library/ls-NDHistory/, "The History of Lotus notes and Domino", Dec. 10, 2005.

US 5,373,559, 12/1994, Kaufman et al. (withdrawn)

\* cited by examiner

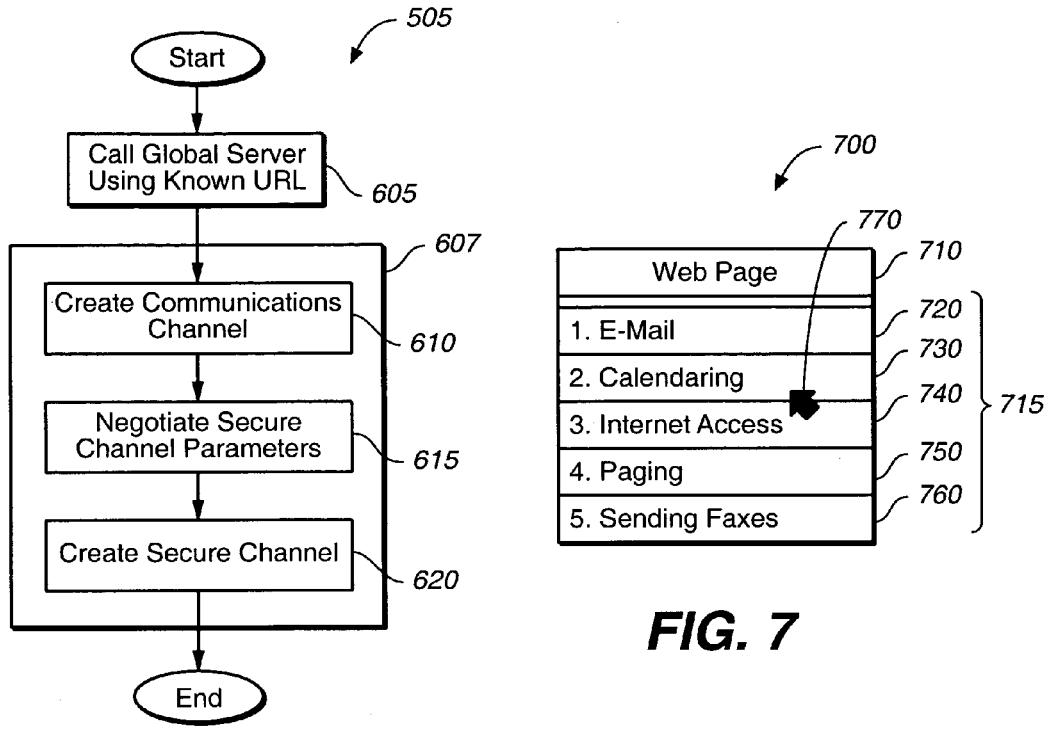
FIG. 6
FIG. 7
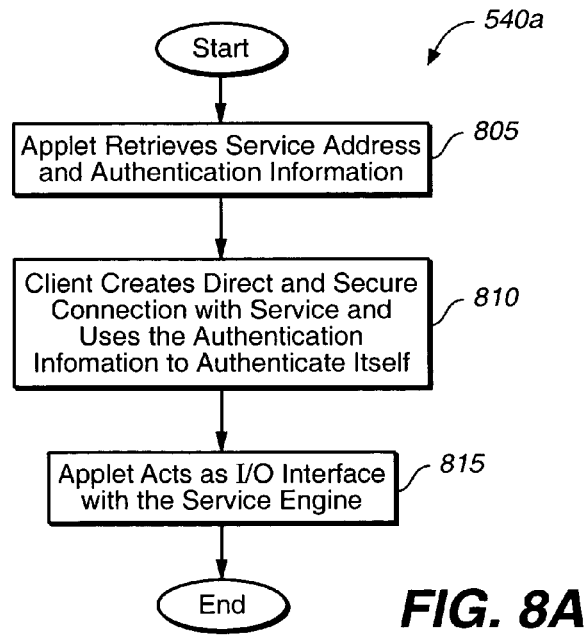
FIG. 8A

SYSTEM AND METHOD FOR ENABLING SECURE ACCESS TO SERVICES IN A COMPUTER NETWORK

CROSS-REFERENCE TO RELATED APPLICATIONS

This application is related to patent application entitled "System and Method for Globally Accessing Computer Services" Ser. No. 08/766,307, now issued as U.S. Pat. No. 6,131,116 filed on Dec. 13, 1996, by inventors Mark D. Riggins, R. Stanley Bailes, Hong Q. Bui, David J. Cowan, Daniel J. Mendez, Mason Ng, Sean Michael Quinlan, Prasad Wagle, Christine C. Ying, Christopher R. Zuleeg and Joanna A. Aptekar-Strober, which subject matter is hereby incorporated by reference. This related application has been commonly assigned to RoamPage, Inc., now Visto Corporation.

BACKGROUND OF THE INVENTION

1. Field of the Invention

This invention relates generally to computer networks, and more particularly to a system and method for enabling secure access to services in a computer network.

2. Description of the Background Art

In its infancy, the Internet provided a research-oriented environment where users and hosts were interested in a free and open exchange of information, and where users and hosts mutually trusted one another. However, the Internet has grown dramatically, currently interconnecting about 100,000 computer networks and several million users. Because of its size and openness, the Internet has become a target of data theft, data alteration and other mischief.

Virtually everyone on the Internet is vulnerable. Before connecting, companies balance the rewards of an Internet connection against risks of a security breach. Current security techniques help provide client and server authentication, data confidentiality, system integrity and system access control.

The most popular of the current security techniques is a firewall, which includes an intermediate system positioned between a trusted network and the Internet. The firewall represents an outer perimeter of security for preventing unauthorized communication between the trusted network and the Internet. A firewall may include screening routers, proxy servers and application-layer gateways.

For users on the internet to gain access to protected services on the trusted network, they may be required to provide their identity to the firewall by some means such as entering a password or by computing a response to a challenge using a hardware token. With proper authentication, the user is allowed to pass through the firewall into the local network, but is typically limited to a predetermined set of services such as e-mail, FTP, etc.

Some local network managers place just outside the firewall a server, often referred to as a "sacrificial lamb" for storing non-confidential data which is easily accessible by the remote user but providing little security.

A De-Militarized Zone, or DMZ, sits between two firewalls protecting a trusted network. The external firewall protects servers in the DMZ from external threats while allowing HyperText Transfer Protocol (HTTP) requests. The internal firewall protects the trusted network in the event that one of the servers in the DMZ is compromised. Many companies use DMZs to maintain their web servers.

Another security technique for protecting computer networks is the issuance and use of a public key certificates. Public key certificates are issued to a party by a certificate authority, which via some method validates the party's identity and issues a certificate stating the party's name and public key. As evidence of authenticity, the certificate authority digitally signs the party's certificate using the certificate authority's private key.

Thus, when a user via a client computer connects to a server, the client computer and server exchange public key certificates. Each party verifies the authenticity of the received certificates by using the certificate authority's public key to verify the signature of the certificate. Then, by encrypting messages with the server's public key the user can send secure communications to the server, and by encrypting messages with the user's public key the server can send secure communications to the user. Although any party might present a public key certificate, only the real user and the real host have the corresponding private key needed to decrypt the message. Examples of authentication and key distribution computer security systems include the Kerberos™ security system developed by the Massachusetts Institute of Technology and the NetSP™ security system developed by the IBM Corporation.

These security techniques do not, however, solve problems associated with a roaming (traveling) user. For the roaming user, maintaining identification and authentication information such as passwords, certificates, keys, etc. is a cumbersome process. Further, accessing multiple systems requires multiple keys, which often are too complex to track and use. Also, direct access to systems behind firewalls compromises security. Therefore, a system and method are needed to enable remote access to computer services easily and securely.

SUMMARY OF THE INVENTION

The present invention provides a system and method for enabling secure access to services in a computer network. The network system includes a global server coupled via a computer network to computer services. The global server includes a communications engine for establishing a communications link with a client; security means coupled to the communications engine for determining client privileges; a servlet host engine coupled to the security means for providing to the client, based on the client privileges, an applet which enables I/O with a secured service; and a keysafe for storing keys which enable access to the secured services. The global server may be coupled to multiple sites, wherein each site provides multiple services. Each site may be protected by a firewall. Accordingly, the global server stores the keys for enabling communication via the firewalls with the services.

A method includes the steps of establishing a communications link with a client; identifying and authenticating the client; determining client privileges; providing to the client, based on the client privileges, an applet which enables I/O with a secured service; and retrieving a key which enables access to the secured service.

The system and method of the present invention advantageously provide a globally/accessible trusted third party, i.e., the global server. This trusted third party securely stores keys, and acts as a single identification and authentication service. Other systems may be accessed through the global server. The global server uses the stored keys to authenticate the user under an identity that is understood by the other system's existing security services, and establishes a secure communications channel to the desired service. Because of a firewall protecting the global server (referred to herein as a global firewall the global server is substantially protected from external threats. Accordingly, the global server provides authorized clients with secure communication through firewalls with services. The global server may enable multiple levels of identification and authentication services. Accordingly, the global server may enable multiple levels of resource access based on the user's status, the strengths of the identification and the authentication and on the privacy of the communications channel.

Because of the global firewall and the identification and authentication services performed by the global server, corporations can store relatively secret information on the global server for use by authorized clients. Yet, the present invention also enables corporations to maintain only a portion of their secret information on the global server, so that there would be only this limited loss should the trusted third party system be compromised. Further, the global server advantageously may act as a client proxy for controlling access to services, logging use of keys and logging access of resources.

BRIEF DESCRIPTION OF THE DRAWINGS

FIG. 6 is a flowchart illustrating details of the FIG. 5 step of creating a link between a client and the global server;

FIG. 7 illustrates an example web page;

FIG. 8A is a flowchart illustrating details of the FIG. 5 step of accessing a service in a first embodiment;

DETAILED DESCRIPTION OF THE PREFERRED EMBODIMENT

Figure 1:
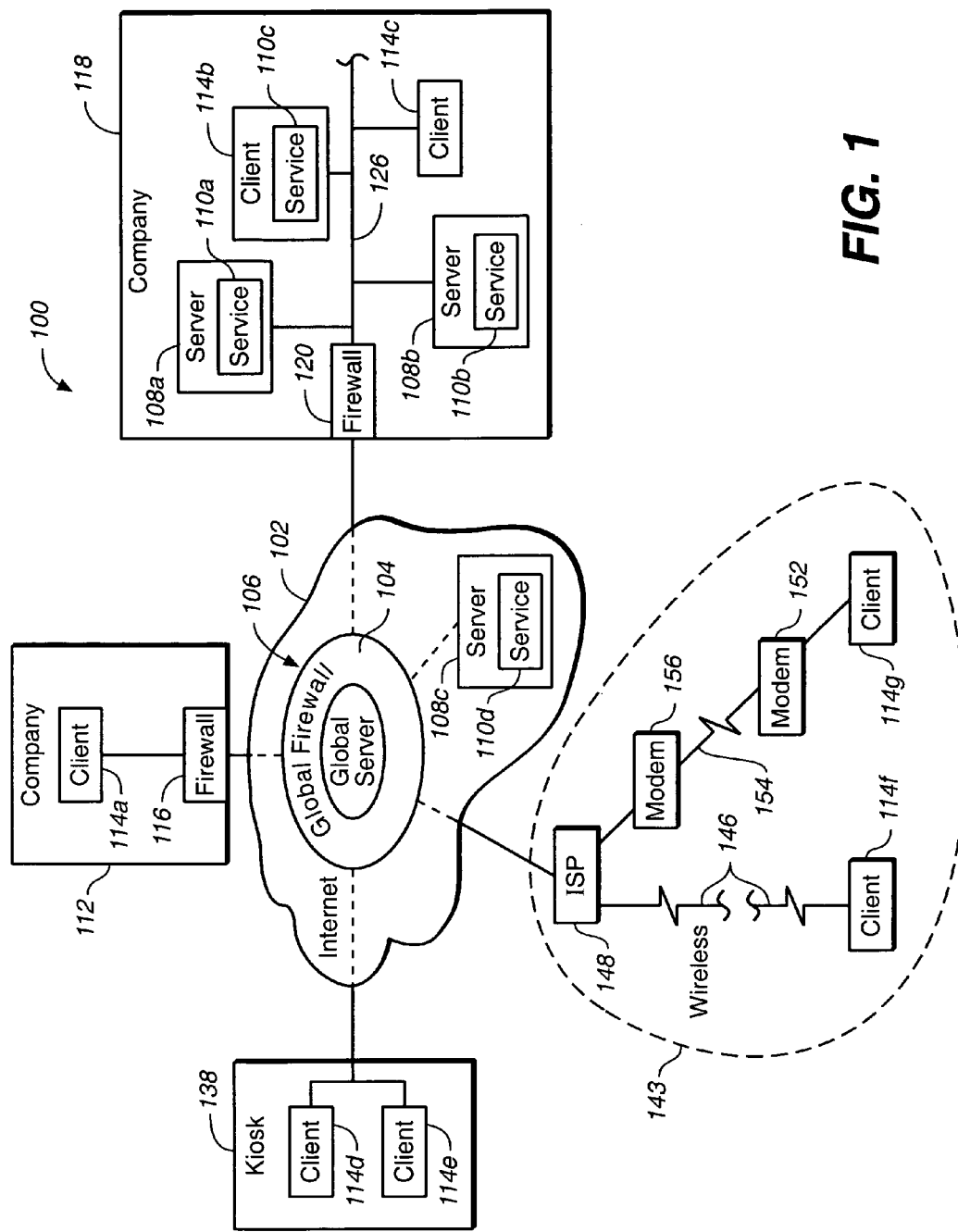
FIG. 1 is a block diagram illustrating a roaming-user network access system, in accordance with the present invention.

FIG. 1 is a block diagram illustrating an exemplary roaming-user network access system 100 in accordance with the present invention. System 100 includes an interconnected network of computers referred to herein as an "Internet" 102. System 100 further includes a first company network 112, a second company network 118, a kiosk network 138 and an Internet Service Provider (ISP) network 143, each network being coupled to the Internet 102.

Company network 112 includes a firewall 116 coupled between the Internet 102 and a client computer 114*a*. Company network 118 includes a firewall 120 coupled between the Internet 102 and an internal network signal bus 126. Company network 118 further includes a first server 108*a* for providing a first service 110*a*, a second server 108*b* for providing a second service 110*b*, a first client computer 114*b* storing a program for providing a third service 110*c* and a second client computer 114*c*, each being coupled to signal bus 126. Example services 110*a*–110*d* include an e-mail service program, an address book service program, a calendar service program, a paging service program, and a company database service program.

The kiosk network 138 includes a first client computer 114*d* and a second client computer 114*e*, each being coupled to the Internet 102. The ISP network 143 includes an ISP 148 coupled via a wireless channel 146 to a first client computer 114*f* and coupled via modems 152 and 156 and via transmission line 154 to a second client computer 114*g*.

The Internet 102 includes a global server 106 which is protected by a firewall 104 referred to herein as a "global firewall" 104 includes a server 108*c* for providing a service 110*d*. Intercommunication between client computers 114*a*–114*g* and services 110*a*–110*d* is accomplished via the global server 106. If, for example, a user of any one of the client computers 114*a*–114*g* wants to access a service 110*a*–110*d* (which is provided at a location within system 100, that is unknown to the user), then the user applies a known Uniform Resource Locator (URL) to access a web page operated by global server 106. An example web page 700 is shown in and described with reference to FIG. 7. The global firewall 104 protects the global server 106 from external threats.

Before obtaining access privileges to the functionality provided by the global server 106, the user must first obtain authorization from the global server 106. Obtaining authorization typically requires user identification and authentication, for example, using public-key certificates. Once authenticated, the global server 106 provides the user with access to the services 110*a*–110*d*. It will be appreciated that varying levels of access to services 110*a*–110*d* will be granted based on varying strengths of identification and authentication and on the privacy of the communications channel.

To enable user access to and control of the services 110*a*–110*d*, the global server 106 may use conventional applets, servlets or agents in a distributed network environment, such as Java™ distributed environment produced by the Netscape Corporation. The global server 106 provides the user's client with access to and control of the service 110*a*–110*d*. The global server 106 may redirect the user's client to access the service 110*a*–110*d*, the global server 106 may access the service 110*a*–110*d* and provide I/O to the client by proxy, or the global server 106 may provide the service 110*a*–110*d* itself. These three different modes of access to the services 110*a*–110*d* are described with reference to FIGS. 8A–8C.

The global server 106 maintains the network addresses of all the services 110*a*–110*d*, the user's public and private keys, the user's account numbers, firewall authentication information, etc. Firewall authentication information includes the necessary identification, passwords and certificates needed to pass firewalls 116 and 120. Accordingly, the user need only maintain the URL of the global server 106, and identification and authentication information such as a password or hardware token for obtaining access to the functionality of the global server 106. Thus, the roaming user can access computer services 110*a*–110*d* using any computer terminal which is connected to the Internet 102.

Figure 2:
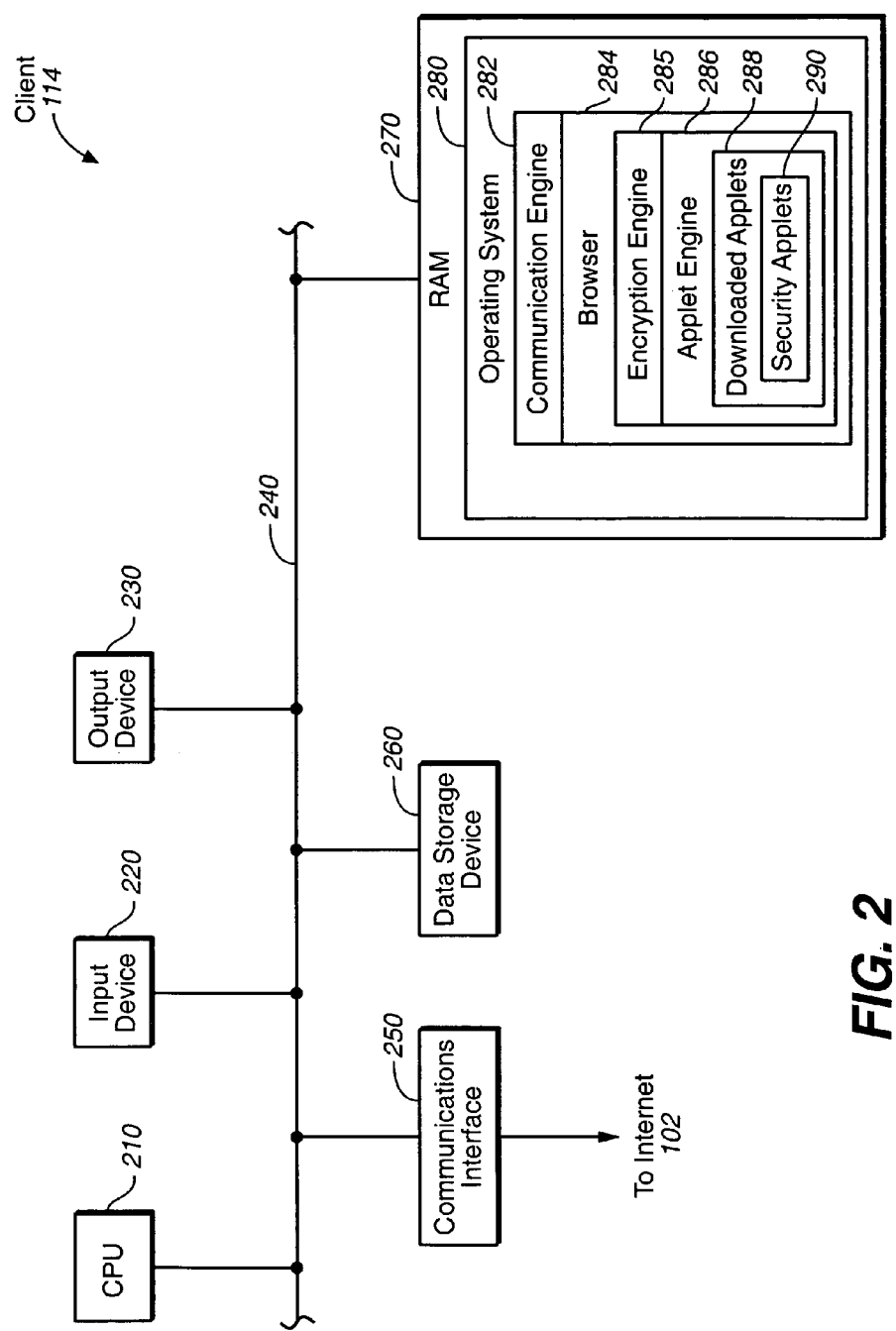
FIG. 2 is a block diagram illustrating details of an example client of FIG. 1.

FIG. 2 is a block diagram illustrating details of a client computer 114, such that each of clients 114*a*–114*d* is an instance of the client 114. The client 114 includes a Central Processing Unit (CPU) 210 such as a Motorola Power PC® microprocessor or an Intel Pentium® microprocessor. An input device 220 such as a keyboard and mouse, and an output device 230 such as a Cathode Ray Tube (CRT) display are coupled via a signal bus 240 to CPU 210. A communications interface 250, a data storage device 260 such as Read Only Memory (ROM) or a magnetic disk, and a Random-Access Memory (RAM) 270 are further coupled via signal bus 240 to CPU 210. The communications interface 250 of client computer 114 is coupled to the Internet 102 as shown in and described with reference to FIG. 1.

An operating system 280 includes a program for controlling processing by CPU 210, and is typically stored in data storage device 260 and loaded into RAM 270 for execution. Operating system 280 includes a communication engine 282 for generating and transferring message packets to and from the internet 106 via the communications interface 250.

Operating system 280 further includes an internet engine such as a web browser 284, e.g., the Netscape™ web browser produced by the Netscape Corporation or the Internet Explorer™ web browser produced by the Microsoft Corporation. The web browser 284 includes an encryption engine 285 for encrypting messages using public and private keys, and an applet engine 286 for executing applets 288 downloaded from the global server 106 to enable the access to computer services 110a–110d. Downloaded applets 288 may include security applets 290 for performing services such as user identification and authentication, message integrity services, and certificate verification. The browser 284 further receives web page data (391, FIG. 3), configuration data 390 and information identifying a set of selectable services 110a–110d, and uses the information to display the web page (700, FIG. 7). The web browser 284 enables a user via the client 114a–114g to select one of the services 110a–110d for execution.

It will be appreciated that a client 114a–114g such as client 114b may include a service engine 490 (see FIG. 4) for providing a service 110a–110d such as service 110c. Thus, it is possible for a client 114b user to request access to service 110c via the global server 106, without knowing that the service 110c is provided by client 114b. Accordingly, the global server 106 will provide client 114 with an applet 288 for providing user interface I/O of service 110c back to client 114b.

Figure 3:
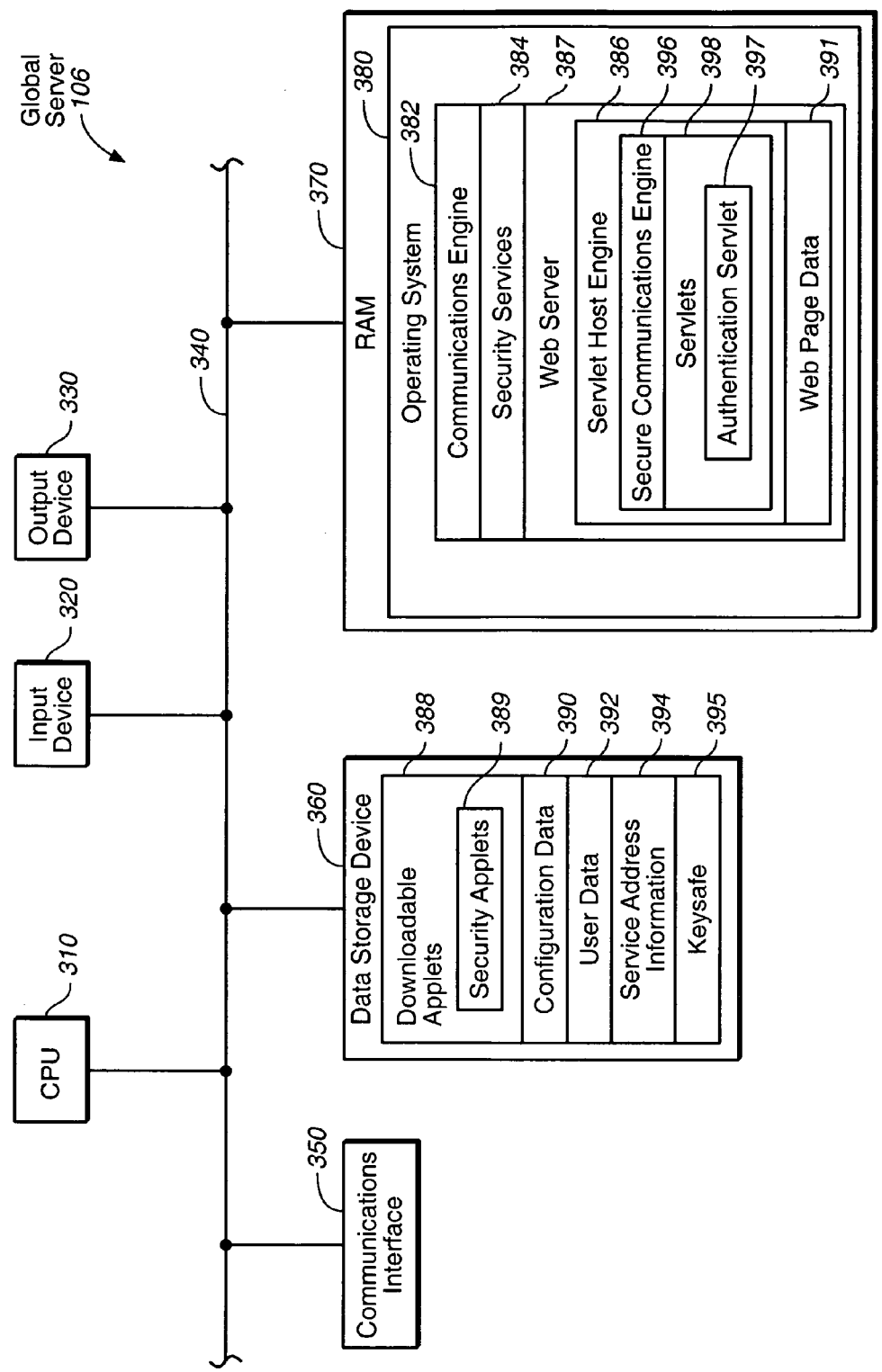
FIG. 3 is a block diagram illustrating details of the global server of FIG. 1.

FIG. 3 is a block diagram illustrating details of the global server 106, which includes a CPU 310 such as a Motorola Power PC® microprocessor or an Intel Pentium® microprocessor. An input device 320 such as a keyboard and mouse, and an output device 330 such as a CRT display are coupled via a signal bus 340 to CPU 310. A communications interface 350, a data storage device 360 such as ROM or a magnetic disk, and a RAM 370 are further coupled via signal bus 340 to CPU 310. The communications interface 350 is conventionally coupled as part of the Internet 102 to the clients 114. Although the global server 106 is described as a single computer, it will be appreciated that the global server 106 may include multiple computers networked together.

Operating system 380 includes a program for controlling processing by CPU 310, and is typically stored in data storage device 260 and loaded into RAM 370 for execution. Operating system 380 includes a communication engine 382 for generating and transferring message packets to and from client computers 114 via the communications interface 350.

Operating system 380 further includes, as part of global firewall 104, security services 384 for opening a communications channel with users. For example, when a client attempts to access the global server 106, the security services 384 first determines whether the global server 106 accepts in-bound communications from a particular port (not shown) and whether a servlet host engine 386, described below, is authorized to connect to that particular port. If so, the security services 384 allows the communications engine 382 to open a communications channel via the particular port to the client 114a–114g. Otherwise, no channel will be opened.

The operating system 380 further includes a web server 387 which, based on user's identification, the strength of the user's authentication and the privacy of the communications channel, forwards web page data 391 and information identifying a set of available services 110a–110d to the client 114a–114g. An example web page 700 is shown and described with reference to FIG. 7. The web server 387 enables a user to select a service 110a–110d from the web page 700.

The web server 387 includes a servlet host engine 386, which downloads security applets 290 including an authentication applet (not shown) to the client computer 114 and accordingly executes an authentication servlet 397 of servlets 398 for performing identification and authentication services. The authentication applet 290 prompts the user for identification and authentication information, and then communicates the information to the authentication servlet 397. The authentication servlet 397 verifies that the information is correct. It will be noted that the user's authentication information is not necessarily sent to the authentication servlet 397, but rather its existence and correctness can also be proven via a secure means such as a secure hash. The servlet host engine 386 further includes a secure communications engine 396 which may use public key certificates to negotiate a secure communications channel with the client computer 114.

Upon selection of a service 110a–110d, the servlet host engine 386 downloads a corresponding applet 388, corresponding configuration data 390 and corresponding user data 392 and may download corresponding service address information 394 to the client computer 114. Configuration data 390 includes information for configuring the user's web browser 284, for configuring the downloaded applets 288, and for configuring the selected service 110a–110d. Configuration is described in the related co-pending application referenced above. User data 392 may include user-and-service-specific information such as stored bookmarks, calendar data, pager numbers, etc. which was specifically stored on the global server 106 for easy access. Service address information 394 identifies the location of the services 110a–110d provided in system 100 by the global server 106. The client computer 114 executes the corresponding downloaded applet 288, which via the servlet host engine 386 (possibly using a corresponding servlet 398) enables the user to access and to control the corresponding services 110a–110d. The downloadable applets 388, configuration data 390, user data 392 and service address information 394 may be stored on the data storage device 360.

A keysafe 395 is a data file for storing each user's identification information, each user's public and private keys, each firewall's password information, etc. The keysafe 395 is organized in a linked list format so that, based on the selected service 110a–110d, the global server 106 can retrieve the appropriate firewall's password information, the appropriate user's identification information and keys, etc. The keysafe 395 may be stored on the data storage device 360.

Figure 4:
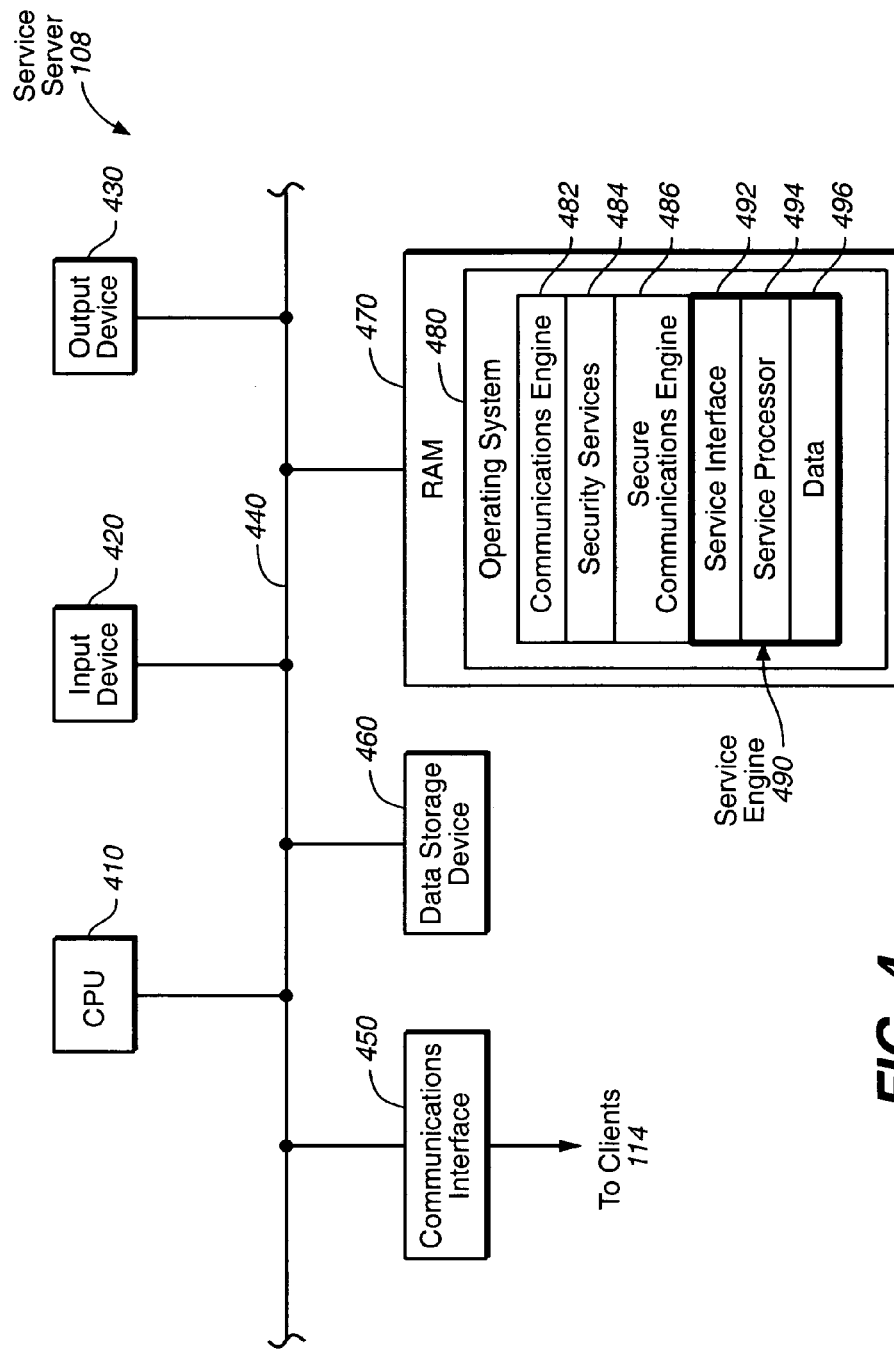
FIG. 4 is a block diagram illustrating details of an example service server of FIG. 1.

FIG. 4 is a block diagram illustrating details of a service server 108, such that servers 108a–108c and client 114b are instances of server 108. Server 108 includes a CPU 410 such as a Motorola Power PC® microprocessor or an Intel Pentium® microprocessor. An input device 420 such as a keyboard and mouse, and an output device 430 such as a CRT display are coupled via a signal bus 440 to CPU 410. A communications interface 450, a data storage device 460 such as ROM or a magnetic disk, and a RAM 470 are further coupled via signal bus 440 to CPU 410. The communications interface 450 is coupled to the clients 114 as shown in and described with reference to FIG. 1.

The operating system 480 includes a program for controlling processing by CPU 410, and is typically stored in data storage device 460 and loaded into RAM 470 for execution. Operating system 480 also includes a communications engine 482 for generating and transferring message packets via the communications interface 450 to and from clients 114 or to and from global server 106. Operating system 480 further includes security services 484 for negotiating a secure channel with users, a secure communications engine 486 for opening the secure channel with the users, and a service engine 490 for providing a service 110*a*–110*d* to the users.

The service engine 490 includes a service interface 492 for receiving and translating messages to and from downloaded applets 288 currently executing on the client 114, and includes a service processor 494 and service data 496 for processing the service requests from the user. The service data 496 may include previously generated documents, database information, etc. It will be appreciated that the service data 496 is similar to the user data 392, such that it includes the same type of information but is maintained on the service server 108 instead of on the global server 108.

Figure 5:
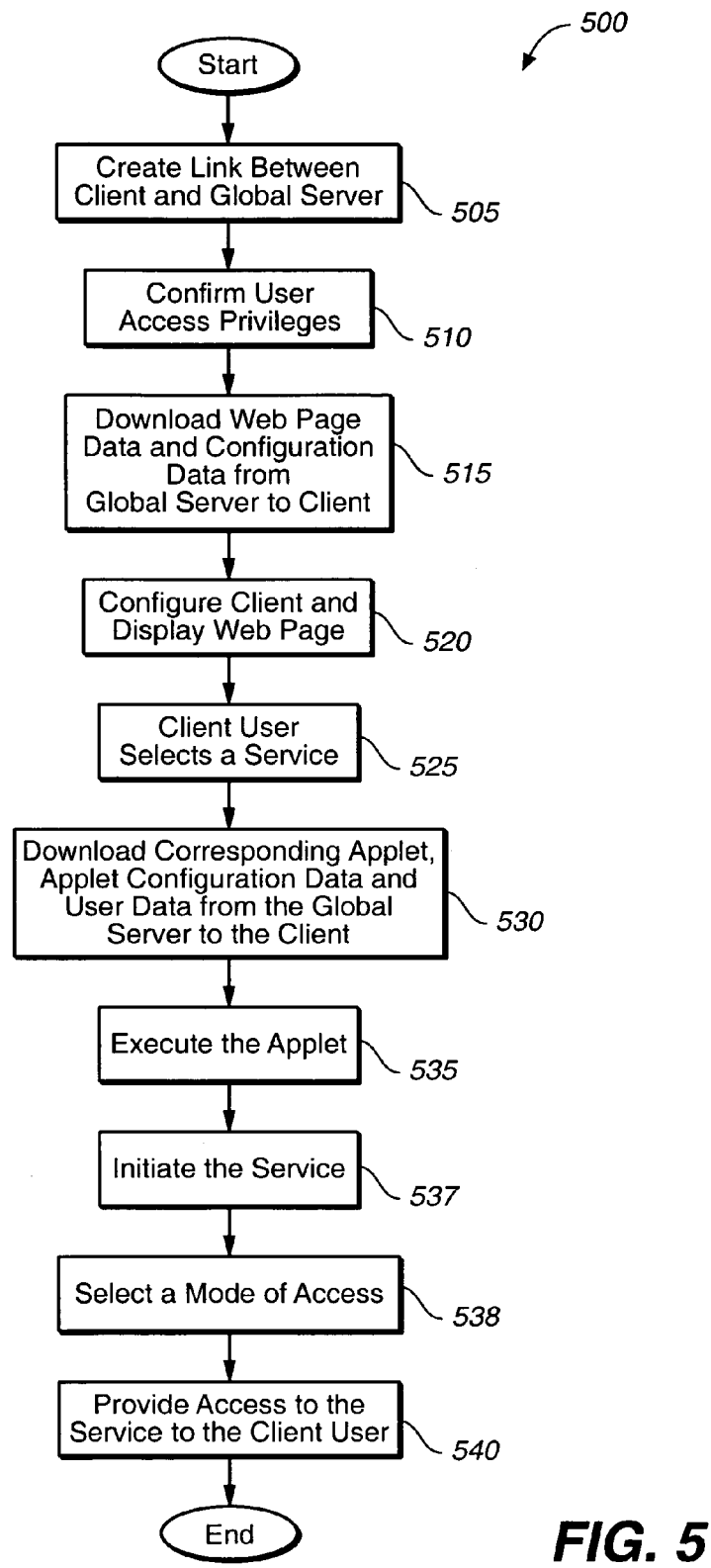
FIG. 5 is a flowchart illustrating a method for remotely accessing a secure service.

FIG. 5 is a flowchart illustrating a method 500 enabling a user to access services 110*a*–110*d* in computer network system 100. Method 500 begins by the client 114 in step 505 creating a communications link with the global server 106. Step 505 is described in greater detail with reference to FIG. 6. The global server 106 in step 510 confirms that the user has privileges to access the functionality of the global server 106. Confirming user access privileges may include examining a user certificate, obtaining a secret password, using digital signature technology, etc. It will be appreciated that the security services 384 may cause the servlet host engine 386 to forward a security applet 389 via the communications channel to the client 114 for performing user authentication.

After user access privileges are confirmed, the web server 387 of the global server 106 in step 515 downloads web page data 391 and configuration data 390 to the client 114. The browser 284 of the client 114 in step 520 uses the web page data 391 and the configuration data 390 to display a web page 700 (FIG. 7) on the output device 230 of the client 114 and to enable access to the services 110*a*–110*d* which are offered by the global server 106. An example web page 700 is shown and described with reference to FIG. 7. Configuration of the client 114 and of the web page 700 are described in detail in the cross-referenced patent application.

From the options listed on the web page 700, the user in step 525 via input device 220 selects a service 110*a*–110*d*. In response, the servlet host engine 386 of the global server 106 in step 530 downloads the corresponding applet(s) 388, applet configuration data 390, user data 392 and possibly service address information 394 to the client 114. Applet configuration data 390 preferably includes user-specific preferences, such as user-preferred fonts, for configuring the selected service 110*a*–110*d*. User data 392 may include user-specific and service-specific information such as stored bookmarks, calendar data, pager numbers, etc. Service address information 394 identifies the location of the selected service 110*a*–110*d*. Alternatively, the corresponding applet(s) 388, applet configuration data 390, user data 392 and service address information 394 could have been downloaded in step 515 with the web page data 391 and the configuration data 390.

The applet engine 286 of the client 114 in step 535 executes the corresponding downloaded applet 288. The service server 108 in step 537 initiates the service engine 490. The global server 106 in step 538 selects one of the three modes of access described in FIGS. 8A–8C for enabling the client computer 114 to communicate with the corresponding service engine 490. For example, if the user selects the service 110*d* on server 108*c*, which is not protected by a separate firewall, then the global server 106 may provide the user with direct access. If the user selects service 110*a* provided by server 108*a* within company network 118, then the global server 106 may access the service 110*a* as a proxy for the user. It will be appreciated that each firewall 106 and 120 may store policies establishing the proper mode of access the global server 106 should select. Other factors for selecting mode of access may include user preference, availability and feasibility. The global server 106 in step 540 provides the client 114 user with access to the selected service 110*a*–110*d*. Step 540 is described in greater detail with reference to FIGS. 8A, 8B and 8C.

FIG. 6 is a flowchart illustrating details of step 505, which begins by the client 114 user in step 605 using a known Uniform Resource Locator (URL) to call the global server 106. The global server 106 and the client 114 in step 607 create a secure communications channel therebetween, possibly by applying Secure Sockets Layer (SSL). That is, the security services 384 of the global server 106 in step 610 determine if in-bound secure communications are permitted and, if so, creates a communications channel with the client 114. The browser 284 of the client 114 and the security services 384 of the global server 106 in step 615 negotiate secure communications channel parameters, possibly using public key certificates. An example secure communications channel is RSA with RC4 encryption. It will be appreciated that the global server 106 may be configured to use one of ten encryption protocols and the client 114 may be enabled to use one of five encryption protocols. Step 615 thus may include selecting one of the encryption protocols which is common to both the global server 106 and the client 114. The encryption engine 285 of the client 114 and secure communications engine 396 of the global server 114 in step 620 use the secure channel parameters to create the secure communications channel. Method 505 then ends.

FIG. 7 illustrates an example URL-addressable HyperText Markup Language (HTML)-based web page 700, as maintained by the servlet host engine 386. The web page 700 includes a title 710 "Web Page," a listing of the provided services 715 and a pointer 770, for selecting one of the provided services 715. As illustrated, the provided services 715 may include an e-mail service 720, a calendaring service 730, an internet access service 740, a paging service 750 and a fax sending service 760. Although not shown, other services such as bookmarking, QuickCard™, etc. may be included in the web page 700.

FIG. 8A is a flowchart illustrating details of step 540 in a first embodiment, referred to as step 540*a*, wherein the global server 106 provides the client 114 with a direct connection to the service 110*a*–110*d*. Step 540*a* begins by the downloaded applet 288 in step 805 retrieving the service address 394 of the selected service 110*a*–110*d* from data storage device 360 and the authentication information for the service 110*a*–110*d* from the keysafe 395. The communications engine 282 in step 810 creates a direct and secure connection with the communications engine 482 of the service server 108 at the retrieved service address, and uses the authentication information to authenticate itself. The applet 288 in step 815 acts as the I/O interface with the service engine 490, which is described in detail in the cross-referenced patent application. Step 540*a* then ends.

Figure 8B:
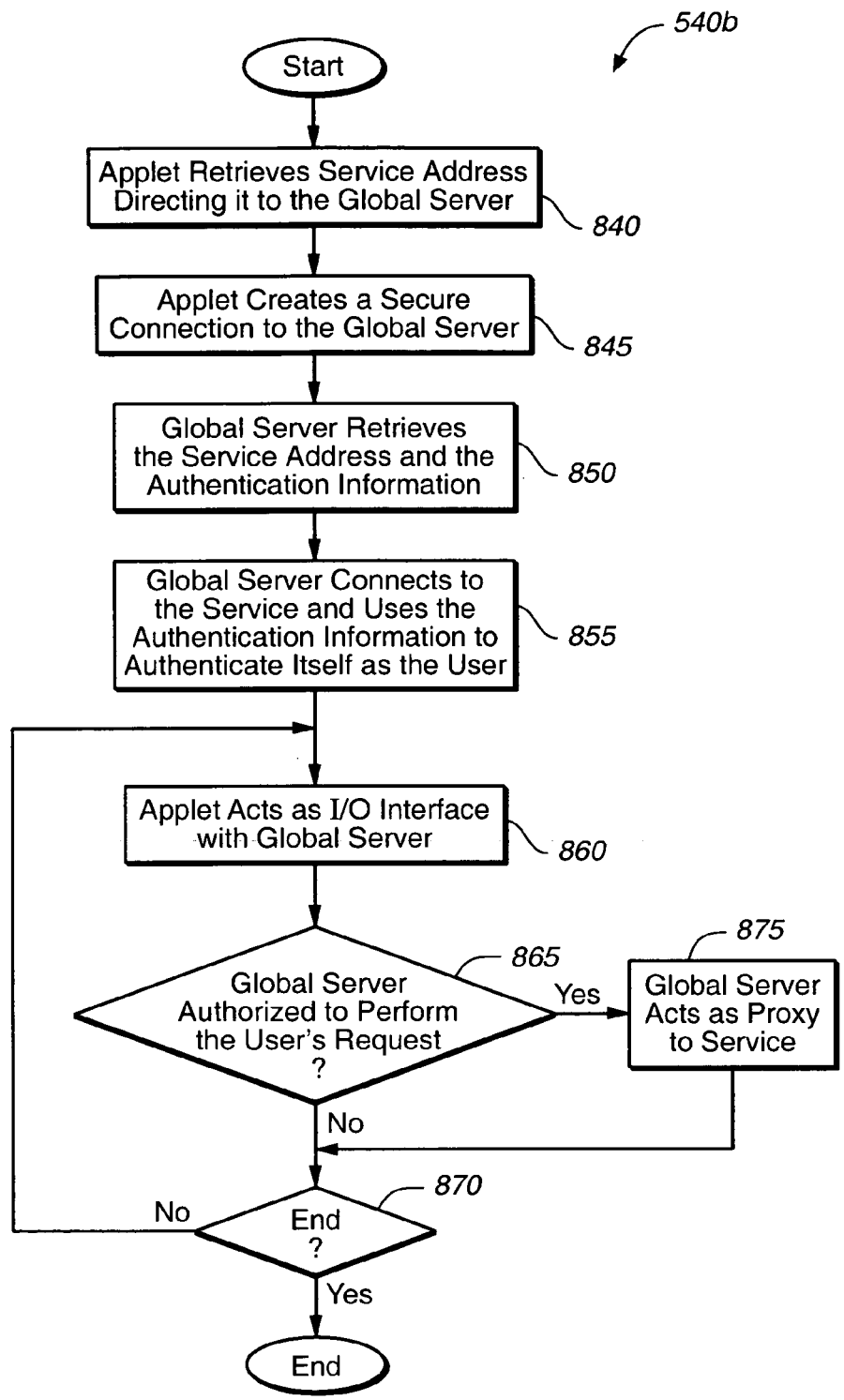
FIG. 8*b* is a flowchart illustrating details of the FIG. 5 step of accessing a service in a second embodiment.

FIG. 8B is a flowchart illustrating details of step 540 in a second embodiment, referred to as step 540*b*, wherein the global server 106 acts for the client 114 as a proxy to the service 110*a*–110*d*. Step 540*b* begins with the applet 288 in step 840 retrieving the "service" address, which results in directing it to the global server 106. Thus, the applet 288 in step 845 creates a connection with the global server 106. The servlet host engine 386 of the global server 106 in step 850 retrieves the service address of the selected service 110*a*–110*d* and the authentication information for the selected service 110*a*–110*d* from the keysafe 395. The secure communications engine 396 of the global server 106 in step 855 negotiates secure channel parameters for creating a secure channel with the secure communications engine 486 of the service server 108.

Thereafter, the applet 288 in step 860 acts as the I/O interface (enables the user to make requests of the service engine 490) with the secure communications engine 396 of the global server 106. If the servlet host engine 386 in step 865 determines that it is unauthorized to perform a client 114 user's request, then the servlet host engine 386 in step 870 determines whether the method 540*b* ends, e.g., whether the user has quit. If so, then method 820*b* ends. Otherwise, method 540*b* returns to step 860 to obtain another request. If the servlet host engine 386 in step 865 determines that it is authorized to perform the client 114 user's request, then the servlet host engine 386, possibly using servlets 398, acts as the proxy for the client 114 to the service engine 490. As proxy, the servlet host engine 386 forwards the service request to the service 110*a*–110*d* for the applet 288 and forwards responses to the requesting applet 288 currently executing on the client 114. Method 540*b* then returns to step 870.

Figure 8C:
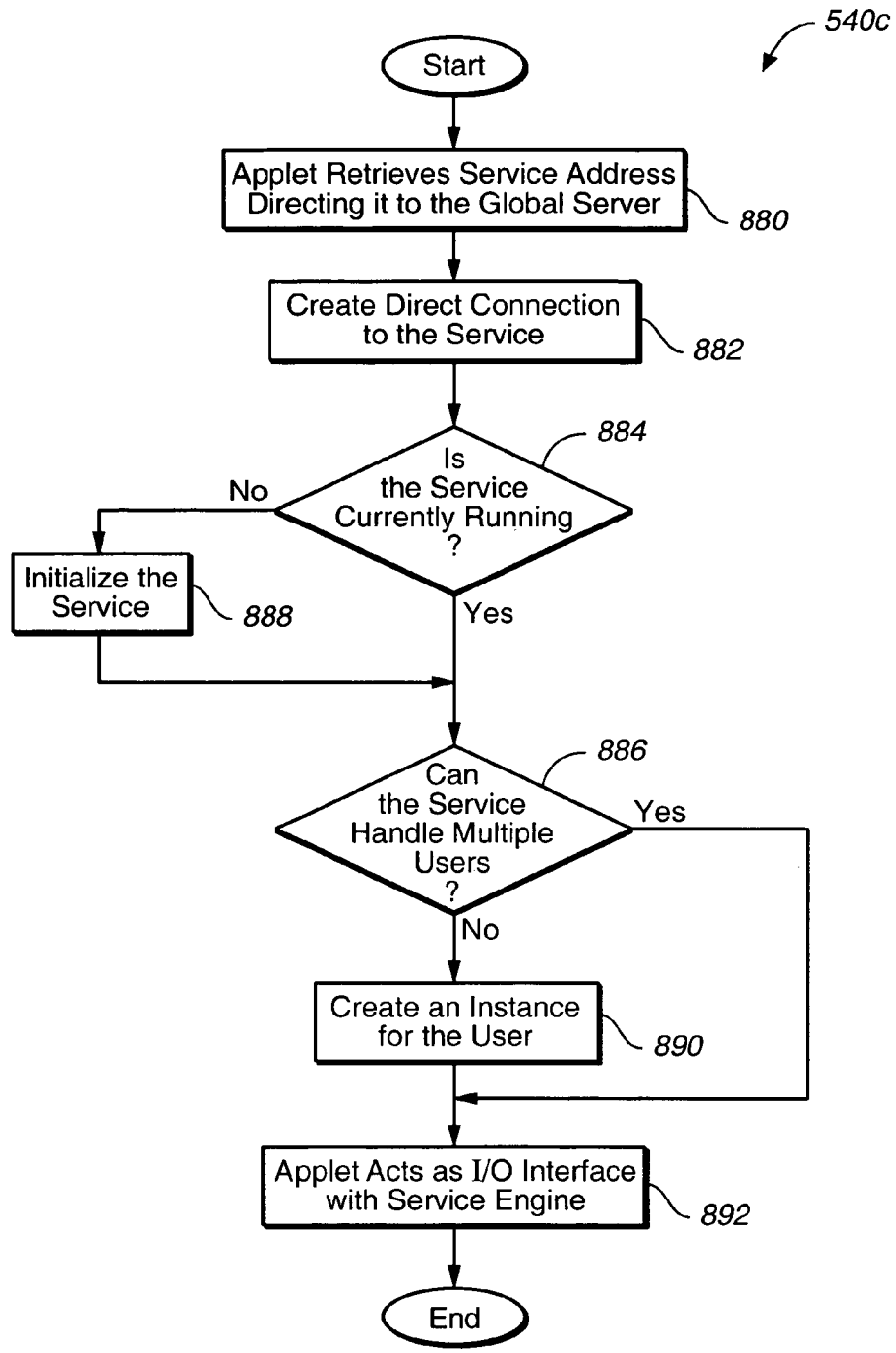
FIG. 8C is a flowchart illustrating details of the FIG. 5 step of accessing a service in a third embodiment.

FIG. 8C is a flowchart illustrating details of step 540 in a third embodiment, referred to as step 540*c*, wherein the service 110*a*–110*d* being requested is located on the global server 106. Step 540*c* begins with the applet 288 in step 880 retrieving the service address for the service 110*a*–110*d*, which results in providing the applet 288 with the service address of the service 110*a*–110*d* on the global server 106. Thus, the applet 288 in step 882 creates a secure connection with the global server 106. No additional step of identification and authentication is needed since the client 114 has already identified and authenticated itself to the global server 106 in step 510 of FIG. 5.

In step 884, a determination is made whether the service 110*a*–110*d* is currently running. If so, then in step 886 a determination is made whether the service 110*a*–110*d* can handle multiple users. If not, then the global server 106 in step 890 creates an instance for the user, and the applet 288 in step 892 acts as the I/O interface with the service 110*a*–110*d* on the global server 106. Otherwise, if the service 110*a*–110*d* in step 886 determines that it cannot handle multiple users, then method 540*a* proceeds to step 892. Further, if in step 884 the global server 106 determines that the service 110*a*–110*d* is not currently running, then the global server 106 in step 888 initializes the service 110*a*–110*d* and proceeds to step 886.

The foregoing description of the preferred embodiments of the invention is by way of example only, and other variations of the above-described embodiments and methods are provided by the present invention. Components of this invention may be implemented using a programmed general purpose digital computer, using application specific integrated circuits, or using a network of interconnected conventional components and circuits. The embodiments described herein have been presented for purposes of illustration and are not intended to be exhaustive or limiting. Many variations and modifications are possible in light of the foregoing teaching. The invention is limited only by the following claims.

What is claimed is:

1. A system on a server computer system, comprising:
   a communications engine configured to establish a communications link with a client;
   a security services engine coupled to the communications engine configured to present to the client a plurality of user authentication protocol options, each user authentication protocol option having a particular level of authentication associated with it to authenticate a user according to at least one user authentication protocol and to determine user privileges based on the identity of the user and the level of authentication;
   a web server engine configured to present a set of available services based on the user privileges, at least one of the available services requiring additional authentication information to be provided before access to the service is granted to enable the client to select a particular service from the set of available services;
   a host engine coupled to the security services engine and to the web server configured to provide to the client executable service communication code that enables communication with the particular service; and
   a keysafe configured to store keys, each key for enabling communication between the client and service selected from the set of available services and including all additional authentication information required by the selected service for authenticating the user to the selected service, the executable service communication code functioning to retrieve a key corresponding to the particular service from the keysafe upon execution of the code.

2. The system of claim 1, wherein the communications engine uses SSL to create a secure communications link with the client.

3. The system of claim 1, wherein the communications engine negotiates an encryption protocol for transferring messages to and from the client.

4. The system of claim 1, wherein the communications engine uses public key certificates for transferring messages to and from the client.

5. The system of claim 1, wherein the security services use public key certificates to authenticate a user of the client to determine the user privileges.

6. The system of claim 1, wherein the security services use a digital signature to authenticate the user to determine the user privileges.

7. The system of claim 1, wherein the host engine forwards to the client security code for enabling the client to perform a security protocol recognized by the security services.

8. The system of claim 1, wherein one of the available services is secured by a firewall and one of the keys includes the additional authentication information to enable communication through the firewall.

9. The system of claim 1, further comprising a firewall for protecting the system.

10. The system of claim 1, wherein one of the keys includes an address identifying the location of the selected service.

11. The system of claim 1, wherein the code uses a key to provide to the client a direct connection with the selected service.

12. The system of claim 1, further comprising a proxy for communicating with the selected service, and wherein the code enables the client to communicate with the proxy and one of the keys enables the proxy to locate the selected service.

13. A method comprising:
   establishing a communications link with a client;
   presenting to the client a plurality of user authentication protocol options, each user authentication protocol option having a particular level of authentication associated with it;
   authenticating the user according to at least one user authentication protocol option; determining user privileges based on the identity of a user and the level of authentication;
   presenting a set of available services based on the user privileges, at least one of the available services requiring additional authentication information to be provided before access to the service is granted;
   enabling the client to select a particular service from a set of available services;
   providing to the client executable service communication code that enables communication with the particular service; and
   retrieving a key from a set of keys, each key corresponding to a respective service from the set of available services, the retrieved key for enabling communication between the client and the particular service selected and including all additional authentication information required by the selected service for authenticating the user to the selected service, the executable service communication code functioning to retrieve a key corresponding to the particular service fromthe keysaft upon execution of the code.

14. The method of claim 13, wherein establishing a communications link includes the step of using SSL to create a secure communications link with the client.

15. The method of claim 13, wherein establishing a communications link includes the step of negotiating an encryption protocol for transferring messages to and from the client.

16. The method of claim 13, wherein establishing a communications link includes the step of using public key certificates for transferring messages to and from the client.

17. The method of claim 13, wherein determining user privileges includes the step of using public key certificates to authenticate a user of the client.

18. The method of claim 13, wherein determining user privileges includes using a digital signature to authenticate the user.

19. The method of claim 13, wherein establishing a communications link includes forwarding to the client security code for enabling the client to perform a recognized security protocol.

20. The method of claim 13, further comprising:
   using one of the keys to communicate through a firewall to the selected service.

21. The method of claim 13, wherein the method is performed by a server employing a firewall to protect the server.

22. The method of claim 13, wherein one of the keys includes an address identifying the location of the selected service.

23. The method of claim 13, wherein providing includes the step of providing to the client a direct connection with the service.

24. The method of claim 13, further comprising using a proxy to communicate with the service, and wherein providing includes enabling the client to communicate with the proxy.

25. A system on a server computer system, comprising:
   means for establishing a communications link with a client;
   means for presenting the client a plurality of user authentication protocol options, each user authentication protocol option having a particular level of authentication;
   means for authenticating a user according to at least one user authentication protocol;
   means for determining user privileges based on the identity of the user and the level of authentication;
   means for presenting a set of available services based on the user privileges, at least one of the available services requiring additional authentication information to be provided before granting access to the service;
   means for enabling the client to select a particular service from a set of available services;
   means for providing to the client executable service communicaiton code that enables communication with the particular service; and
   means for retrieving a key from a set of keys, each key corresponding to a respective service from the set of available services, the retrieved key for enabling communication between the client and the particular service selected and including all additional authentication information required by the selected service for authenticating the user to the selected service, the executable service communication code functioning to retrieve a key corresponding to the particular service selected from the keysafe upon execution of the code.

* * * * *

UNITED STATES PATENT AND TRADEMARK OFFICE
CERTIFICATE OF CORRECTION

PATENT NO. : 7,287,271 B1 Page 1 of 1
APPLICATION NO. : 08/841950
DATED : October 23, 2007
INVENTOR(S) : Mark D. Riggins It is certified that error appears in the above-identified patent and that said Letters Patent is hereby corrected as shown below:

On the title page, the Terminal Disclaimer information is incorrect. Item (45) and the Notice should read:

-- (45) Date of Patent: Oct. 23, 2007

(*) Notice: Subject to any disclaimer, the term of this Patent is extended or adjusted under 35 U.S.C. 154(b) by 0 days.--

Signed and Sealed this

Eleventh Day of December, 2007

JON W. DUDAS
*Director of the United States Patent and Trademark Office*